US008656268B2

(12) United States Patent
Finger et al.

(10) Patent No.: US 8,656,268 B2
(45) Date of Patent: Feb. 18, 2014

(54) QUEUEING EVENTS IN AN INTERACTIVE MEDIA ENVIRONMENT

(75) Inventors: James C. Finger, Kirkland, WA (US); John Andre Yovin, Woodinville, WA (US); Khurshed Mazhar, Kirkland, WA (US); Olivier Colle, Redmond, WA (US); Arthur William James Freeman, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1296 days.

(21) Appl. No.: 11/351,085

(22) Filed: Feb. 9, 2006

(65) Prior Publication Data

US 2007/0006233 A1    Jan. 4, 2007

Related U.S. Application Data (60) Provisional application No. 60/695,944, filed on Jul. 1, 2005.

(51) Int. Cl.
*G06F 17/00* (2006.01)

(52) U.S. Cl.
USPC ........... 715/210; 715/201; 715/202; 715/203; 718/100

(58) Field of Classification Search
USPC ................. 715/200, 201, 202, 203, 204, 210; 718/100
See application file for complete search history.

(56) References Cited

U.S. PATENT DOCUMENTS

| | | | |
|---|---|---|---|
| 5,195,092 A | | 3/1993 | Wilson et al. |
| 5,208,745 A | * | 5/1993 | Quentin et al. ................. 700/83 |
| 5,394,547 A | * | 2/1995 | Correnti et al. ............... 717/175 |
| 5,452,435 A | * | 9/1995 | Malouf et al. ................ 713/500 |
| 5,515,490 A | | 5/1996 | Buchanan et al. |

(Continued)

FOREIGN PATENT DOCUMENTS

| | | |
|---|---|---|
| CA | 2340144 A1 | 9/2001 |
| EP | 1345119 | 9/2003 |

(Continued)

OTHER PUBLICATIONS

International Multimedia Conference; vol. 9 Proceedings of the Ninth ACM International Conference on Multimedia, Poellauer, Schwan, West, pp. 231-240, 2001.*

(Continued)

*Primary Examiner* — Cesar Paula
*Assistant Examiner* — David Faber
(74) *Attorney, Agent, or Firm* — Carole Boelitz; Micky Minhas (57) ABSTRACT

An arrangement is provided where all applications in an interactive media environment run on a single application thread in a media player. Event queues are utilized to schedule the application thread's processing of workitems corresponding to events that occur in the environment. Workitems include methods to be invoked when the workitem is processed and arguments for the method. Workitems further include a begin time and an end time and are ordered in the event queue first by begin time followed by the order in which they were inserted into the queue. The application thread marks workitems whose begin times corresponds to the current or previous time and then processes marked workitems from the queue in order. Such processing is committed so that once the application thread begins processing of a workitem it does not stop. Workitems are dropped from the event queue if their end times have been passed.

11 Claims, 8 Drawing Sheets

(56) References Cited

U.S. PATENT DOCUMENTS

| | | |
|---|---|---|
| 5,608,859 A | 3/1997 | Taguchi |
| 5,631,694 A | 5/1997 | Aggarwal et al. |
| 5,659,539 A | 8/1997 | Porter et al. |
| 5,694,560 A | 12/1997 | Uya et al. |
| 5,717,468 A | 2/1998 | Baryla |
| 5,758,008 A | 5/1998 | Tozaki et al. |
| 5,760,780 A | 6/1998 | Larson et al. |
| 5,794,018 A | 8/1998 | Vrvilo et al. |
| 5,809,512 A | 9/1998 | Kato |
| 5,877,763 A | 3/1999 | Berry et al. |
| 5,949,410 A | 9/1999 | Fung |
| 5,966,121 A | 10/1999 | Hubbell et al. |
| 5,995,095 A | 11/1999 | Ratakonda |
| 6,067,638 A | 5/2000 | Benitz et al. |
| 6,069,633 A | 5/2000 | Apparao et al. |
| 6,100,881 A | 8/2000 | Gibbons et al. |
| 6,122,433 A | 9/2000 | McLaren |
| 6,212,595 B1 | 4/2001 | Mendel |
| 6,369,830 B1 | 4/2002 | Brunner et al. |
| 6,384,846 B1 | 5/2002 | Hiroi |
| 6,385,596 B1 | 5/2002 | Wiser et al. |
| 6,414,686 B1 | 7/2002 | Protheroe et al. |
| 6,426,778 B1 | 7/2002 | Valdez |
| 6,430,570 B1 | 8/2002 | Judge et al. |
| 6,442,658 B1 | 8/2002 | Hunt et al. |
| 6,453,459 B1 | 9/2002 | Brodersen et al. |
| 6,505,153 B1 | 1/2003 | Van Thong et al. |
| 6,564,382 B2* | 5/2003 | Duquesnois et al. ......... 725/100 |
| 6,565,153 B2 | 5/2003 | Hensel et al. |
| 6,577,341 B1 | 6/2003 | Yamada et al. |
| 6,628,283 B1 | 9/2003 | Gardner |
| 6,629,150 B1 | 9/2003 | Huded |
| 6,642,939 B1 | 11/2003 | Vallone et al. |
| 6,665,835 B1* | 12/2003 | Gutfreund et al. ............ 715/202 |
| 6,700,588 B1 | 3/2004 | MacInnis et al. |
| 6,715,126 B1 | 3/2004 | Chang et al. |
| 6,785,729 B1 | 8/2004 | Overby et al. |
| 6,906,643 B2 | 6/2005 | Samadani et al. |
| 6,920,613 B2 | 7/2005 | Dorsey et al. |
| 6,925,499 B1 | 8/2005 | Chen et al. |
| 7,120,859 B2 | 10/2006 | Wettach |
| 7,131,143 B1 | 10/2006 | LaMacchia et al. |
| 7,200,357 B2 | 4/2007 | Janik et al. |
| 7,210,037 B2 | 4/2007 | Samar |
| 7,222,237 B2 | 5/2007 | Wuidart et al. |
| 7,290,263 B1 | 10/2007 | Yip et al. |
| 7,437,659 B2* | 10/2008 | Taniwaki et al. ............. 715/200 |
| 7,496,845 B2 | 2/2009 | Deutscher et al. |
| 7,500,175 B2 | 3/2009 | Colle et al. |
| 7,721,308 B2 | 5/2010 | Finger et al. |
| 2001/0054180 A1 | 12/2001 | Atkinson |
| 2001/0056504 A1 | 12/2001 | Kuznetsov |
| 2001/0056580 A1 | 12/2001 | Seo et al. |
| 2002/0038257 A1 | 3/2002 | Joseph et al. |
| 2002/0091837 A1 | 7/2002 | Baumeister et al. |
| 2002/0099738 A1 | 7/2002 | Grant |
| 2002/0099952 A1 | 7/2002 | Lambert et al. |
| 2002/0118220 A1 | 8/2002 | Lui et al. |
| 2002/0138593 A1 | 9/2002 | Novak et al. |
| 2002/0157103 A1 | 10/2002 | Song et al. |
| 2002/0170005 A1 | 11/2002 | Hayes |
| 2002/0188616 A1 | 12/2002 | Chinnici et al. |
| 2003/0025599 A1 | 2/2003 | Monroe |
| 2003/0026398 A1 | 2/2003 | Duran et al. |
| 2003/0076328 A1 | 4/2003 | Beda et al. |
| 2003/0078930 A1 | 4/2003 | Surcouf et al. |
| 2003/0093792 A1 | 5/2003 | Labeeb et al. |
| 2003/0142137 A1 | 7/2003 | Brown et al. |
| 2003/0152904 A1 | 8/2003 | Doty, Jr. |
| 2003/0174160 A1 | 9/2003 | Deutscher et al. |
| 2003/0182364 A1 | 9/2003 | Large et al. |
| 2003/0182624 A1 | 9/2003 | Large |
| 2003/0187801 A1 | 10/2003 | Chase |
| 2003/0204511 A1 | 10/2003 | Brundage et al. |
| 2003/0204613 A1 | 10/2003 | Hudson et al. |
| 2003/0210270 A1 | 11/2003 | Clow et al. |
| 2003/0231863 A1 | 12/2003 | Eerenberg et al. |
| 2004/0001706 A1 | 1/2004 | Jung et al. |
| 2004/0027259 A1 | 2/2004 | Soliman et al. |
| 2004/0034622 A1 | 2/2004 | Espinoza et al. |
| 2004/0034795 A1 | 2/2004 | Anderson et al. |
| 2004/0039834 A1 | 2/2004 | Saunders et al. |
| 2004/0039909 A1 | 2/2004 | Cheng |
| 2004/0049793 A1 | 3/2004 | Chou |
| 2004/0068510 A1 | 4/2004 | Hayes et al. |
| 2004/0107179 A1 | 6/2004 | Dalrymple, III |
| 2004/0107401 A1* | 6/2004 | Sung et al. ................. 715/500.1 |
| 2004/0111270 A1 | 6/2004 | Whitham |
| 2004/0123316 A1 | 6/2004 | Kendall et al. |
| 2004/0133292 A1 | 7/2004 | Sakurai et al. |
| 2004/0143823 A1 | 7/2004 | Wei |
| 2004/0148514 A1 | 7/2004 | Fee et al. |
| 2004/0153648 A1 | 8/2004 | Rotholtz et al. |
| 2004/0153847 A1 | 8/2004 | Apte et al. |
| 2004/0156613 A1 | 8/2004 | Hempel et al. |
| 2004/0187157 A1 | 9/2004 | Chong et al. |
| 2004/0190779 A1 | 9/2004 | Sarachik et al. |
| 2004/0205478 A1 | 10/2004 | Lin et al. |
| 2004/0205479 A1 | 10/2004 | Seaman et al. |
| 2004/0210824 A1 | 10/2004 | Shoff et al. |
| 2004/0220926 A1 | 11/2004 | Lamkin et al. |
| 2004/0221311 A1 | 11/2004 | Dow et al. |
| 2004/0223740 A1 | 11/2004 | Itoi |
| 2004/0228618 A1 | 11/2004 | Yoo et al. |
| 2004/0243927 A1 | 12/2004 | Chung et al. |
| 2004/0244003 A1* | 12/2004 | Perfetto et al. ................ 718/100 |
| 2004/0247292 A1 | 12/2004 | Chung et al. |
| 2004/0250200 A1 | 12/2004 | Chung et al. |
| 2004/0267952 A1 | 12/2004 | He et al. |
| 2004/0268224 A1 | 12/2004 | Balkus et al. |
| 2005/0015815 A1 | 1/2005 | Shoff et al. |
| 2005/0022116 A1 | 1/2005 | Bowman et al. |
| 2005/0088420 A1 | 4/2005 | Dodge et al. |
| 2005/0091574 A1 | 4/2005 | Maaniitty et al. |
| 2005/0114896 A1 | 5/2005 | Hug et al. |
| 2005/0122530 A1 | 6/2005 | Denk et al. |
| 2005/0125741 A1 | 6/2005 | Clow |
| 2005/0132266 A1 | 6/2005 | Ambrosino et al. |
| 2005/0140694 A1 | 6/2005 | Subramanian et al. |
| 2005/0149729 A1 | 7/2005 | Zimmer et al. |
| 2005/0183016 A1 | 8/2005 | Horiuchi et al. |
| 2005/0190947 A1 | 9/2005 | Dulac |
| 2005/0244146 A1 | 11/2005 | Tsumagari et al. |
| 2005/0251732 A1* | 11/2005 | Lamkin et al. ............. 715/500.1 |
| 2005/0289348 A1 | 12/2005 | Joy |
| 2006/0020950 A1 | 1/2006 | Ladd et al. |
| 2006/0041522 A1 | 2/2006 | Rodriguez-Rivera |
| 2006/0083486 A1 | 4/2006 | Kanemaru et al. |
| 2006/0123451 A1 | 6/2006 | Preisman |
| 2006/0136914 A1* | 6/2006 | Marascio et al. ............. 718/100 |
| 2006/0140079 A1 | 6/2006 | Hamada et al. |
| 2006/0269221 A1 | 11/2006 | Hashimoto et al. |
| 2006/0274612 A1 | 12/2006 | Kim |
| 2007/0002045 A1 | 1/2007 | Finger et al. |
| 2007/0005757 A1 | 1/2007 | Finger et al. |
| 2007/0005758 A1 | 1/2007 | Hughes, Jr. et al. |
| 2007/0006061 A1 | 1/2007 | Colle et al. |
| 2007/0006063 A1 | 1/2007 | Jewsbury et al. |
| 2007/0006078 A1 | 1/2007 | Jewsbury et al. |
| 2007/0006079 A1 | 1/2007 | Hayes et al. |
| 2007/0006080 A1 | 1/2007 | Finger et al. |
| 2007/0006233 A1 | 1/2007 | Finger et al. |
| 2007/0006238 A1 | 1/2007 | Finger et al. |
| 2007/0033419 A1 | 2/2007 | Kocher et al. |
| 2007/0174387 A1 | 7/2007 | Jania et al. |
| 2007/0198834 A1 | 8/2007 | Ksontini et al. |
| 2007/0277245 A1 | 11/2007 | Goto et al. |
| 2008/0126974 A1 | 5/2008 | Fawcett et al. |

(56) References Cited

U.S. PATENT DOCUMENTS

| | | | |
|---|---|---|---|
| 2009/0007160 | A1 | 1/2009 | Wei |
| 2011/0004943 | A1 | 1/2011 | Chaganti et al. |

FOREIGN PATENT DOCUMENTS

| | | | |
|---|---|---|---|
| EP | 1345119 | A | 9/2003 |
| EP | 1473618 | | 11/2004 |
| EP | 1551027 | A1 | 7/2005 |
| EP | 1641259 | A | 3/2006 |
| GB | 2344925 | A | 6/2000 |
| JP | 2000-098999 | | 4/2000 |
| JP | 2001-022498 | | 1/2001 |
| JP | 2003-284003 | | 10/2003 |
| JP | 2004-007610 | | 1/2004 |
| JP | 2004-086551 | | 3/2004 |
| JP | 2004-221900 | | 8/2004 |
| JP | 2005-149394 | | 6/2005 |
| KR | 10 2003 0074093 | | 9/2003 |
| WO | 0217179 | A1 | 2/2002 |
| WO | 02/091178 | | 11/2002 |
| WO | 02091178 | A | 11/2002 |
| WO | 02/103496 | | 12/2002 |
| WO | 03062969 | A1 | 7/2003 |
| WO | 03077249 | | 9/2003 |
| WO | 2004025651 | A1 | 3/2004 |
| WO | 2005002219 | A1 | 1/2005 |
| WO | 2005/029842 | | 3/2005 |
| WO | 2005020236 | A1 | 3/2005 |
| WO | 2005/048261 | | 5/2005 |
| WO | 2005/048592 | | 5/2005 |
| WO | 2005052940 | A1 | 6/2005 |
| WO | 2005/122530 | | 12/2005 |

OTHER PUBLICATIONS

Non Final Office Action for U.S. Appl. No. 11/405,736, dated May 18, 2009, 12 pages.
Cesar et al., "Open Graphical Framework for Interactive TV", IEEE Fifth International Symposium on Multimedia Software Engineering (ISMSE'03) p. 21, accessed at http://doi.ieeecomputersociety.org/10.1109/MMSE.2003.1254418 on Sep. 20, 2005.
Apple, Compressor 2 User Manual, Apr. 25, 2005, Apple, select pages (3 in total).
Apple, Final Cut Pro 5 User Manual, May 11, 2005, Apple, select pages (73 in total).
International Search Report for PCT/US06/23905 of Jun. 20, 2006, 7 pages.
Non-Final Office Action for U.S. Appl. No. 11/355,209, dated May 15, 2009, 12 pages.
International Search Report for PCT/US06/23911, mailed on Jun. 3, 2008, 8 pages.
International Search Report for PCT/US2006/024155, dated Feb. 26, 2007, 8 pages.
International Search Report for PCT/US2006/023906, dated Nov. 20, 2006, 6 pages.
International Search Report for PCT/US06/24034, dated Jun. 20, 2008, 10 pages.
International Search Report for PCT/US2006/024225, dated Feb. 26, 2006, 7 pages.
International Search Report for PCT/US2006/024226 dated Jun. 22, 2006, 7 pages.
Non Final Office Action for U.S. Appl. No. 11/405,737, dated May 18, 2009, 11 pages.
Non Final Office Action for U.S. Appl. No. 11/354,800, dated Sep. 13, 2007, 8 pages.
Non Final Office Action for U.S. Appl. No. 11/355,609, dated Jun. 5, 2009, 12 pages.
Non Final Office Action for U.S. Appl. No. 11/350,595, dated Jun. 26, 2009, 4 pages.
Non Final Office Action for U.S. Appl. No. 11/352,571, dated May 18, 2009, 9 pages.
Non Final Office Action for U.S. Appl. No. 11/354,800, dated Jul. 15, 2008, 7 pages.
Final Office Action for U.S. Appl. No. 11/354,800, dated May 1, 2009, 8 pages.
Advisory Action for U.S. Appl. No. 11/352,575, dated Jul. 14, 2009, 3 pages.
Final Office Action for U.S. Appl. No. 11/352,575, dated Apr. 28, 2009, 19 pages.
Non Final Office Action for U.S. Appl. No. 11/352,575, dated Sep. 2, 2008, 15 pages.
Non Final Office Action for U.S. Appl. No. 11/352,662, dated Jun. 2, 2009, 12 pages.
Anderson et al., "Building multiuser interactive multimedia environments at MERL", Multimedia, IEEE vol. 2, Issue 4, Winter 1995 pp. 77-82, accessed at http://ieeexplore.ieee.org/search/wrapper.jsp?arnumber=482298 on Sep. 30, 2005.
Borchers et al., "Musical Design Patterns: An Example of a Human-Centered Model of Interactive Multimedia", 1997 International Conference on Multimedia Computing and Systems (ICMCS'97) p. 63, accessed at http://doi.ieeecomputersociety.org/10.1109/MMCS.1997.609564 on Sep. 30, 2005.
Fritzsche, "Multimedia Building Blocks for Distributed Applications", 1996 International Workshop on Multimedia Software Development (MMSD '96) p. 0041, accessed at http://doi.ieeecomputersociety.org/10.1109/MMSD.1996.557742 on Sep. 30, 2005.
International Search Report for PCT/US2006/024294 dated Apr. 30, 2007, 7 pages.
International Search Report for PCT/US2006/024423 dated Apr. 24, 2007, 5 pages.
International Search Report for PCT/US2006/024292 dated May 7, 2007, 7 pages.
C. Peng et al., "Digital Television Application Manager", Telecommunications Software and Multimedia Laboratory, Helsinki University of Technology, 2001 IEEE International Conference on Multimedia and Expo, 4 pages.
International Search Report for PCT/US2006/023907, dated Mar. 2, 2007, 7 pages.
Final Office Action dated Jan. 22, 2010 in related U.S. Appl. No. 11/350,595, 6 pages.
Final Office Action dated Dec. 11, 2009 in related U.S. Appl. No. 11/355,209, 16 pages.
Evans, Mark, "Lambda the Ultimate" Sep. 7, 2003, DP-COOL 2003 Proceedings, lambda-the-ultimate.org/classic/message8639.html.
Final Office Action dated Dec. 1, 2009 in related U.S. Appl. No. 11/352,571, 9 pages.
Non-Final Office action dated Oct. 8, 2009 in related U.S. Appl. No. 11/354,800, 18 pages.
Final Office Action dated Jan. 11, 2010 in related U.S. Appl. No. 11/352,662, 13 pages.
Final Office Action dated Dec. 10, 2009 in related U.S. Appl. No. 11/405,736, 14 pages.
Final Office Action dated Nov. 27, 2009 in related U.S. Appl. No. 11/405,737, 12 pages.
Non-Final Office Action dated Dec. 2, 2009 in corresponding U.S. Appl. No. 11/352,575, 23 pages.
Peng et al. "Digital Television Application Manager" 2001 IEEE International Conference on Multimedia and Expo, pp. 685-688.
Z-Order Correction Algorithm for Dialog Boxes, IBM Technical Disclosure Bulletin, IBM Corp. New York, US, vol. 37, No. 8, Aug. 1, 1994.
International Search Report for PCT/US06/24292 dated May 7, 2007, 1 page.
Author Unknown, MHP Project Office: "Digital Video Broadcasting (DVB); Multimedia Home Platform (MHP) Specification 1.1.2" Apr. 25, 2005, part 1, 405 pages.
Author Unknown, MHP Project Office: "Digital Video Broadcasting (DVB); Multimedia Home Platform (MHP) Specification 1.1.2" Apr. 25, 2005, part 2, 405 pages.
Author Unknown, MHP Project Office: "Digital Video Broadcasting (DVB); Multimedia Home Platform (MHP) Specification 1.1.2" Apr. 25, 2005, part 3, 362 pages.

(56) References Cited

OTHER PUBLICATIONS

Final Office Action dated Jan. 25, 2010 in related U.S. Appl. No. 11/351,085, 14 pages.
Non Final Office Action for U.S. Appl. No. 11/351,085, dated Jun. 1, 2009, 14 pages.
International Search Report, PCT/US06/23912, Jun. 19, 2008, pp. 13.
Non-Final Office Action for U.S. Appl. No. 11/405,816, dated Jun. 3, 2008, 12 pages.
Final Office Action for U.S. Appl. No. 11/352,662, dated Jun. 2, 2009, 12 pages.
Non-Final Office Action for U.S. Appl. No. 11/405,737, dated May 18, 2009, 12 pages.
Final Office Action in related Chinese Application Serial No. 200680024232.4, dated Sep. 18, 2009, 9 pages.
Final Office Action in related Chinese Application Serial No. 200680024275.2, dated Nov. 6, 2009, 10 pages.
Final Office Action in related Chinese Application Serial No. 200680024302.6, dated Oct. 23, 2009, 8 pages.
Non-Final Office Action for U.S. Appl. No. 11/405,736, dated May 1, 2009, 14 pages.
Pihkala et al., "Design of a dynamic smil player", IEEE international Conference on Multimedia and Expo, Copyright 2002, pp. 189-192.
Dekeyser et al., "Path locks for XML document collaboration" Proceeding of the 3rd International Conference on Web Information Systems Engineering, copyright 2002, pp. 105-114.
Benekidt, M. et al., "Managing XML Data: An Abridged Overview", Computing in Science and Engineering, IEEE Service Center, Los Alamitos, CA, US, vol. 6, No. 4, 2004, pp. 12-19.
Barton C. et al., "Streaming XPath processing with forward and backward axes", Proceedings 19th International Conference on Data Engineering, Bangalore, India, Conf. 19, Mar. 5, 2003, p. 455-466.
Ben Willmore, "Adobe Photoshop CS Studio Techniques", Pub. Feb. 11, 2004, Safari Online Books, Ch. 3 Section titled "Layers Primer", pp. 104-110, Adobe Press.
Blu-ray Disc Association: "Application Definition Blu-ray Disc Format BD-J Baseline Application and Logical Model Definition for BD-ROM", Internet Citation, Mar. 1, 2005, retrieved Jun. 18, 2008, http://www.blurayjukebox.com/pdfs/bdj_gem_application_definition_0503 07-13404, pp. 1-45.
Author Unknown, Blu-Ray Disc: "White paper Blu-ray Disc Format. 2.B Audip Visual Application Format Specifications for BD-ROM", Internet Citation Mar. 2005, http://www.blu-raydisc.com/assets/downloadablefile/2b_bdrom_audiovisualapplication_0305-12955-13403.pdf, 35 pages.
Notice of Preliminary Rejection with English Language translation issued Jul. 11, 2013, in connection with Korean Patent Application No. 10-2007-7030958 (7 pages total).
Slingerland et al., "Cache Performance for Multimedia Applications," ICS '01:Proceedings of the 15th International Conference on Supercomputing, Jun. 2001, pp. 1-14.
"System performance measure in solaris", Aug. 12, 2004 (retrieved from http://blog.naver.com/avicom/120004914987) with English Language translation (10 pages total).

\* cited by examiner

QUEUEING EVENTS IN AN INTERACTIVE MEDIA ENVIRONMENT

STATEMENT OF RELATED APPLICATION

This application claims the benefit of provisional application No. 60/695,944, filed Jul. 1, 2005, which is incorporated by reference herein.

TECHNICAL FIELD

The described arrangements, systems and methods relate generally to interactive media and more particularly to queuing events in an interactive media environment.

BACKGROUND

Interactive media environments are typically resource constrained in terms of available processing power, memory and other resources that are available to applications running in the environment. One common example of interactive media is video encoded on DVD (digital versatile disc) where users can interact with graphical menus or other controls to navigate to specific video content or invoke special features that are authored into the DVD.

In more complex interactive media environments, despite the limited resources, applications need to respond to users in real-time manner that is frame-accurate with the video. However, the use of real-time multithreaded programming to accomplish such a goal would place a large burden on interactive media authors in dealing with issues such as thread management and synchronization.

SUMMARY

An arrangement is provided where all applications in an interactive media environment run on a single application thread in a media player. Event queues are utilized to schedule the application thread's processing of workitems corresponding to events that occur in the environment. Workitems include methods to be invoked when the workitem is processed and arguments for the method. Thus, the scheduling and processing of workitems from the event queues determines what work get done and when in the environment. Typical events include user events that are fired from user interaction with the media player, system events fired by the media player, and events that are fired by the applications.

In various illustrative examples, workitems further include a begin time and an end time and are ordered in the event queue first by begin time followed by the time in which they were inserted into the queue. In one illustrative example, the application thread marks workitems whose begin time corresponds to the current or previous time and then processes marked workitems from the queue in order. All processing is performed on a committed basis so that once the application thread begins processing a workitem it does not stop. Workitems are dropped from the event queue if their end times have been passed. Workitems for new events that occur during processing are inserted at the end of the queue to be handled after the committed workitems. In another illustrative example, workitems for new events are inserted into the event queue based on their relative begin times to be handled after the committed workitems. Repetitive events, like timer events and application drawing events, may have individual occurrences dropped from the event queue. However, one-shot (i.e., single occurrence, non-repetitive) events are never dropped.

Advantageously, the event queuing model with single application thread provide a stable and predictable methodology for interactive media authors to manage events in a real-time frame-accurate manner where hardware resources, including processor cycles and memory, are limited.

DETAILED DESCRIPTION

Figure 1:
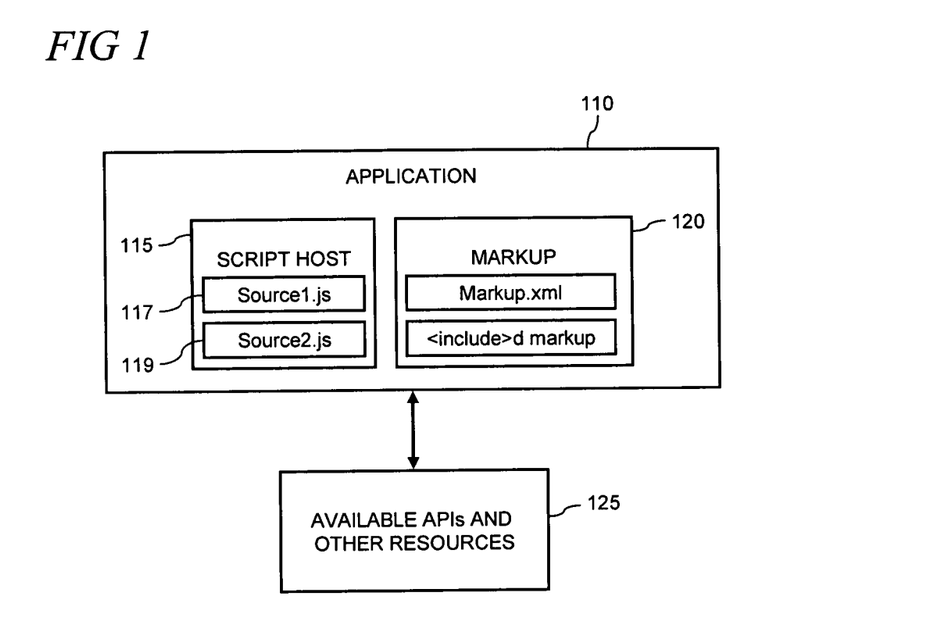
FIG. 1 is an illustrative block diagram showing the elements making up an application used in an interactive media environment.

Referring to FIG. 1, an illustrative block diagram of the elements making up an application 110 used in an interactive media environment is shown. Applications are typically used in the interactive media environment to enable interaction between a user and an interactive media player rendering graphics and video on a coupled display device (such as a television or monitor) through a user interface such as a remote control. More specifically, applications control presentation behavior of various content objects, including video playback, in the environment. Presentation of graphic objects such as menus and interactive buttons over the video is also realized using applications. Applications further manage and control audio playback and sounds in the environment. It is contemplated that multiple applications will generally be running simultaneously in most interactive media settings. However, there is no requirement the multiple applications run simultaneously and the decision to divide or aggregate applications in a particular setting is a design choice of the interactive media author. Applications may also be logically subdivided into application pages depending on the requirements of a specific setting.

The application 110 comprises a script host 115 containing zero or more script files 117 and 119 and zero or more markup documents 120 that is used to generate a document object model (DOM). The markup documents 120 include information relating, for example, to content, style, timing and layout of graphic objects. Thus, the markup context is used generally to provide graphics on a graphics plane in the interactive media environment.

In this illustrative example, the markup documents are XML document files in accordance with W3C standards. As indicated in FIG. 1, multiple physical XML files may be accessed using the <include> element in the <head> section of the markup. In some settings it may be preferable for an application to not have more than one active markup at a time. However, an application may switch its markup 120 by using a <link> element in the markup. Alternatively, an application may switch its markup 120 by utilizing an application programming interface (API) that enables applications to gain access to functional objects within a current application. Using a loadMarkup ( ) call through the API, an application may switch markup files 120 by passing the Uniform Resource Identifier (URI) of the new markup through an API.

In cases where an application accesses a new markup, the API call takes effect only after a current event handler in the application finishes executing its current task. Any current markup-related event handlers that are pending are also cancelled as the new markup, once loaded, will invalidate those event handlers.

In this illustrative example, script host 115 contains script files 117 and 119 which are used along with the markup 120 to implement interactive media experiences. Script files 117 and 119 may be implemented, for example, using ECMAScript as defined by Ecma International in the ECMA-262 specification. Common scripting programming languages falling under ECMA-262 include JavaScript and JScript. In some settings, it may be desirable to implement scripts 117 and 119 using a subset of ECMAScript 262, in particular ECMA-327, along with a host environment and a set of common APIs. Script context in most settings is utilized to deal with interactive control issues from user along with system events, graphics control, video playback, resource management (e.g. use of caching or persistent store resources) and other issues that are not readily or efficiently implemented using solely markup 120.

The availability of APIs and resources to application 110 is indicated by reference numeral 125 in FIG. 1. Resources include, for example, audio and video files, fonts, pictures and images (e.g., in common file formats including PNG, JPEG, GIF, BMP, TIFF etc.) and other resources as may be required by an application according to the circumstances of a specific setting.

Each application 110 maintains its own script host 115 that maintains the context for the script's variables, functions and other states. In most settings, variables and functions in one application are not visible to another application unless the applications are specifically set up to enable such cross-application visibility, for example, by using an object that is shared across all applications. For example, in this illustrative example, the interactive media player object has a single instance that is shared across all applications. Optionally, therefore, special objects may be placed inside script host 115—for example, using a C++ object—to implement singletons (i.e., a objects having limited instantiation) where the special objects all reference the same internal function, for example, of the player. This optional aspect enables interactive media script authors to logically treat common objects as singletons while still allowing the script host 115 to implement the functionality necessary to expose an object to the single script host.

Figure 2:
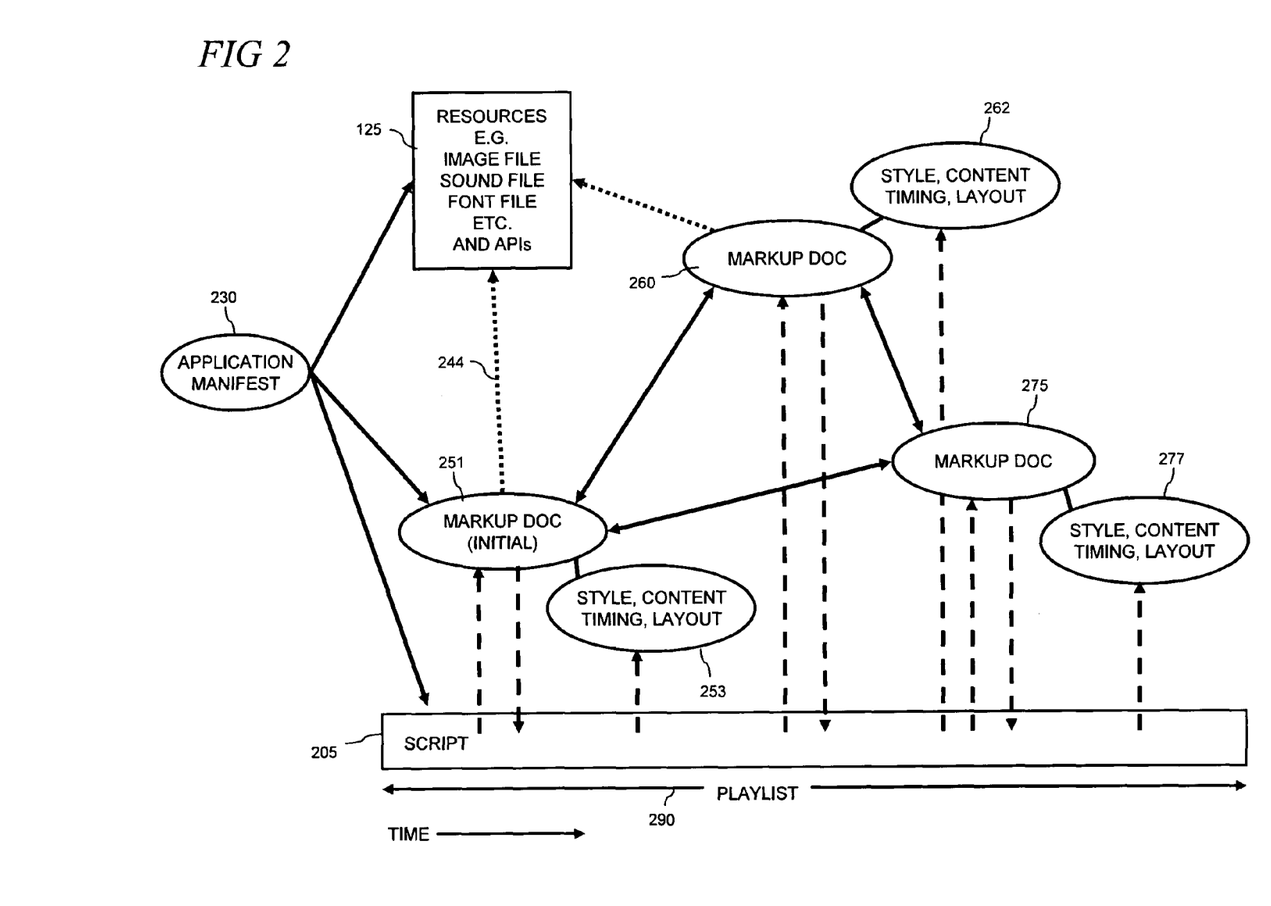
FIG. 2 is an illustrative diagram which shows the relationship among multiple markup documents and script.

Referring now to FIG. 2, an illustrative diagram showing the relationship among multiple markup documents and script is provided. An application manifest 230 interacts with applications which, as noted above, are defined generally by resources 125, script 205, and markup documents 251, 260 and 275 as shown. Each application typically uses a single application manifest file in most settings, but the application manifest is not part of the runtime state of the application. In this illustrative example, the application manifest 230 is encoded as an XML document file.

The application manifest 230 describes the initial markup file 251 to be used by the application 110 (FIG. 1) as well as the script files—collectively indicated by the rectangle with reference numeral 205 in FIG. 2—contained in script host 115 (FIG. 1). If the application manifest 230 lists more than one script, as in this illustrative example, then all the scripts are loaded into a script handling engine in the interactive media player. Thus, the multiple script files are treated and behave as if the script author had concatenated all of the script files into a single large file in the order listed in the application manifest 230.

As shown in FIG. 2, the application manifest 230 refers to resources 125. The resources available to an application in an interactive media environment form a directed graph, rooted by the resources 125 referenced in the application manifest 230. The allowed extent of the graph for each application is proscribed by the application manifest 230.

FIG. 2 shows three applications running in the interactive media environment. As noted above, each application may only have one active markup at a time and application content is kept separate by the applications. As indicated by the arrows between the markup pages 251, 260 and 275, via script 205, the application is able to advance from markup page 251 to 260, and then later from page 260 to 275.

The progression of context execution by applications in the interactive media environment is guided by a playlist 290 which describes, among other things, the relationship among objects in the environment including presentation objects that are rendered by the player onto the display device. These presentation objects typically include video (which may include multiple streams as described in more detail below) and graphics produced by the applications.

Playlist 290 further manages resources across the interactive media environment as a single management entity in order to efficiently allocate and control the consumption of resources by applications. As with the application manifest 230 the playlist 290 may be advantageously embodied as an XML document file in most settings.

The markup pages in FIG. 2 may be used in some settings to fire events into an execution context (created by the script files 117 and 119 in FIG. 1). The execution context then manipulates the DOM created by the current application markup. As the markup is used in the interactive media environment to specify style, content, timing and layout of graphical objects in the environment (as represented by elements 253 262 and 277 in FIG. 2), the combination of script and markup enables the creation of a comprehensive set of capabilities.

Figure 3:
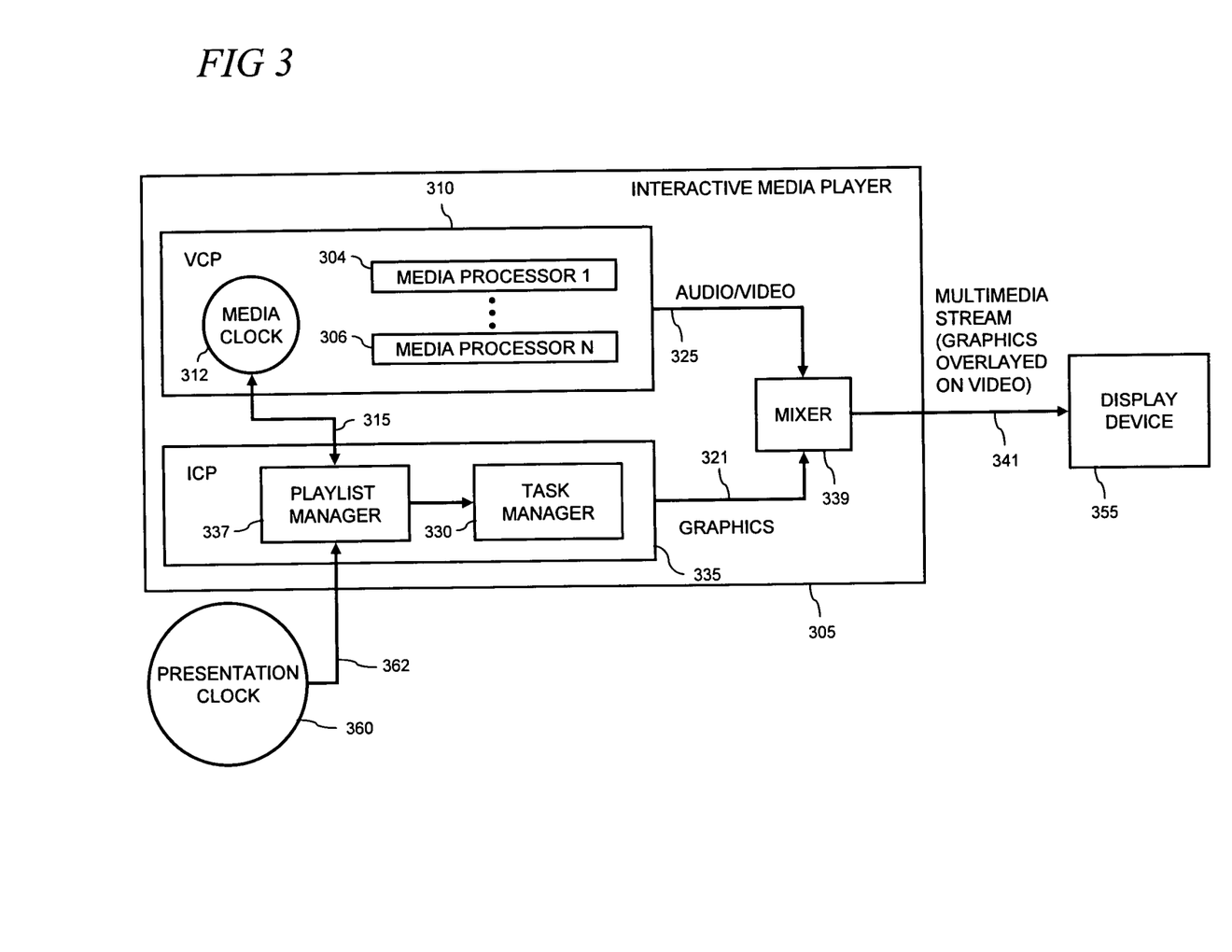
FIG. 3 is a block diagram of an illustrative interactive media player including an interactive content processor, a video content processor and a mixer.

FIG. 3 is a block diagram of a first illustrative interactive media player 305 including an interactive content processor (ICP) 335, video content processor (VCP) 310, and mixer 339. It is noted that the arrangement presented in FIG. 3 provides a logical model which describe features and functions of the illustrative interactive media player 305 that are pertinent to application state management. Thus, an actual implementation of an interactive media player may utilize various structural forms while still operating as described herein to achieve the benefits of application state management. The interactive media player 305 is typically realized in dedicated hardware such as standalone consumer electronic device, or alternatively using a software implementation employing computer readable media with a general purpose processor such as that found in a personal computer.

VCP 310 manages one or more media streams that may be received from multiple sources including a local optical drives such as a DVD drive or a high-definition DVD (HD-DVD) drive, a local memory or a remote broadband source over a network. VCP 310, in this illustrative example, includes one or more media processors 1, 2 . . . N as indicated by elements 304 and 306 in FIG. 3. Media processors 304 and 306 process the received media streams, which typically include audio and video, to decode and render the corresponding images and sound which are output as an audio/video stream on line 325. Audio/video stream 325 may represent a plurality of video elements, for example to render multiple separate video windows using a "picture in picture" type configuration.

Media processors 304 and 306 each comprise a media source interface, demultiplexer and decoder. Media processors 304 and 306 may optionally include decryption capabilities as well. A display device 355 is coupled to receive and display the audio/video stream.

A media clock 312 is utilized so that each received media has an associated "Media Time." When a video stream is paused on the interactive media player 305 then the media clock 312 is paused as well. When the video stream is set by a user to go faster or slower than real time (for example, when the video is put into fast forward, rewind or slow-motion modes—using any of these modes is referred to as "trick play"), then the media clock 312 speeds up or slows down accordingly. The Media Time is thus derived from the media clock and the operation of the media processors 304 and 306. The Media Time is passed to the playlist manager 337 in ICP 335 over line 315. Time in the interactive media environment, including Media Time, is typically counted in units of "ticks."

ICP 335 performs all application-related processing and may be arranged from several components that may be realized in hardware, software, firmware or a combination thereof. The components of ICP 335 include, for example, a markup engine, script language interpreter, and an XML parsing component (not shown). ICP 335 outputs a graphics stream on line 321 which is synchronous with the audio/video stream 325. Mixer 339 takes the graphics stream on line 321 and the audio/video stream on line 325 so that the graphics are rendered in a graphics layer over the video stream to implement an interactive media session for a user.

In most settings, ICP 335 outputs graphics that are synchronized on a frame-by-frame basis with the video stream. However, such synchronization may be performed using other bases, including, for example, time (including Title Time and Media time as defined below), content in the video, or other metadata embedded in the video that is used to indicate or mark a particular point in the stream.

ICP 335 includes a playlist manager 337 and a task manager 330. The playlist manager 337 is responsible for controlling presentation objects in the environment. These objects include video playback on the player 305 along with applications that are running to generate interactive graphics. Playlist manager 337 manages the playlist 290 which is described above in the text accompanying FIG. 2.

The playlist manager 337 also computes the "Title Time" associated with each portion of content in a media stream. A title is a unique sequence of video and audio content with a start and end time that is typically defined by the DVD author. However, what such author defines as a title can be arbitrary. Thus, particular content which is perceived in a video may be part of one title, a complete title, or run across multiple titles.

One example of a title is the copyright warning that precedes all pre-recorded video in both analog and digital format in the United States. The featured attraction (e.g., the main movie) on a DVD is another example and is often the longest title. In some settings, individual chapters in a movie might be designated as separates titles by the DVD author. For all such titles, Title Time is defined as the time elapsed since a given title started playing as shown on the media clock 312.

A presentation clock 360 is coupled to the playlist manager on line 362. The presentation clock 360 is a clock whose time changes at the same pace as a real-world clock (i.e., it takes one second of real time for the presentation clock 360 to advance by one second). In contrast to the media clock 312, the presentation clock 360 never stops and cannot be sped up or slowed down. The Presentation Time from the presentation clock 360 is passed to the task manager 330 which uses it to calculate "Application Time" and application "Page Time."

Application Time is the time elapsed since an application started (or enters an "Active" state as described in more detail below). When multiple applications are in runtime, each application has a notion of its own Application Time. For each application, Application Time always starts at zero when an application is started in the environment.

For example, if an application App1 starts at Presentation Time of 20 arbitrary time units (which is 0 time units for App1) and application App2 starts at Presentation Time of 25 time units (which is 0 time units for App2), then at Presentation Time of 35 time units, App1's Application Time is 15 time units and App2's Application Time is 10 time units. For applications that are logically subdivided into pages, the Page Time is the time elapsed since a page of an application has been loaded.

Figure 4:
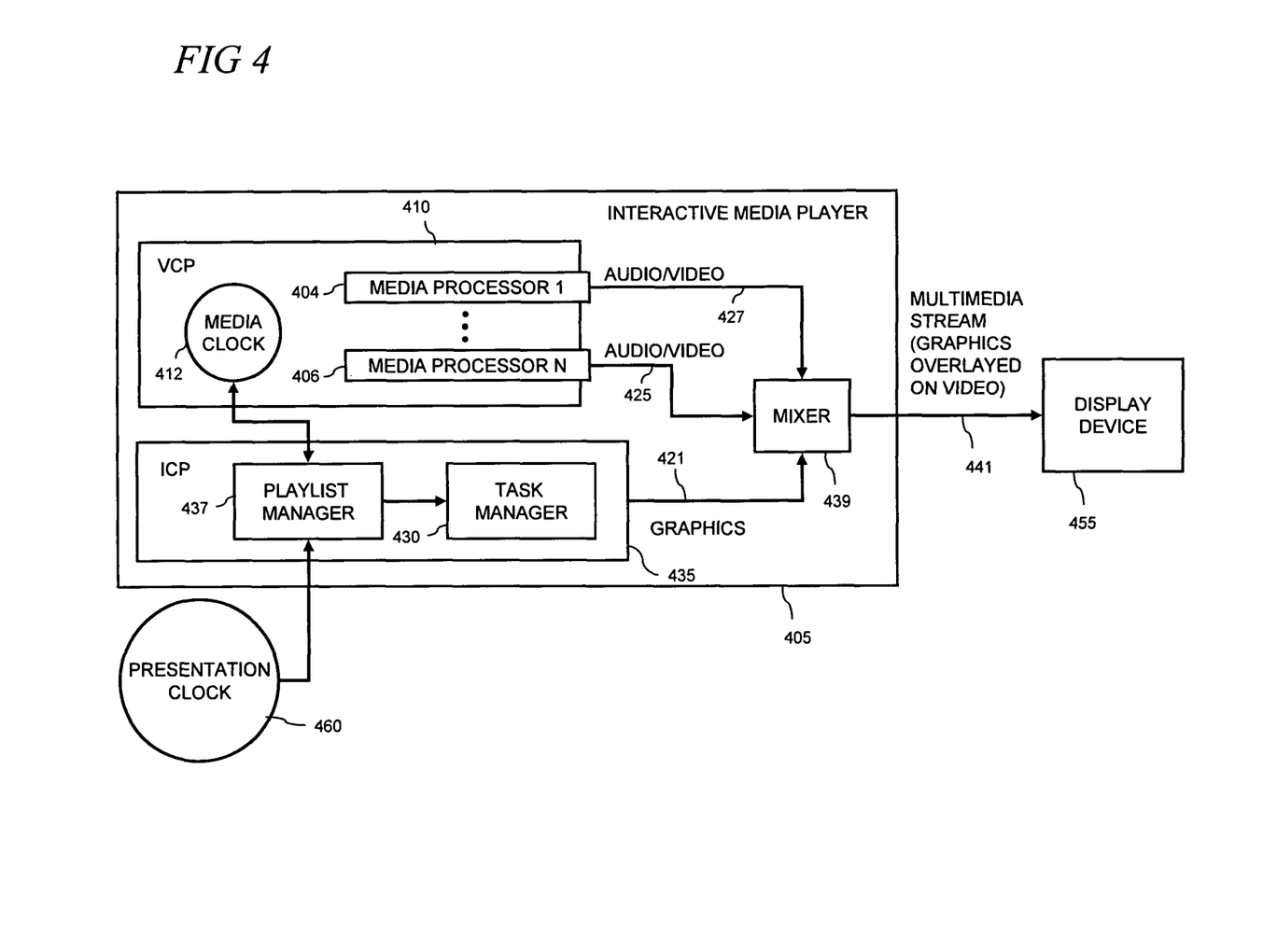
FIG. 4 is a block diagram of a second illustrative interactive media player.

FIG. 4 is a block diagram of a second illustrative media player 405 including an ICP 435, VCP 410, and mixer 439. Interactive media player 405 is similar in form and function to the interactive media player 305 shown in FIG. 3. Notably, however, VCP 435 includes media processors, 1, 2 . . . N (as indicated by elements 404 and 406 in FIG. 4) that are arranged to provide separate feeds 425 and 427 to mixer 439. Such arrangement may be desirable in some settings where manipulation of the individual media streams is performed prior to mixing. For example, image processing/selection techniques such panning and zooming of video in a media stream may be independently implemented on one or more of the N separate feeds represented by reference numerals 425 and 427 in FIG. 4.

The audio/video feeds 425 and 427, along with the synchronous graphics stream from ICP 435 are mixed in mixer 439 and output on line 441 to a display device 455. The other elements in FIG. 4 including ICP 435 (comprising playlist manager 437 and task manager 430), media clock 412 in VCP 410 and presentation clock 460 are configured and function in a similar manner as their counterparts shown in FIG. 3 and described in the accompanying text.

Figure 5:
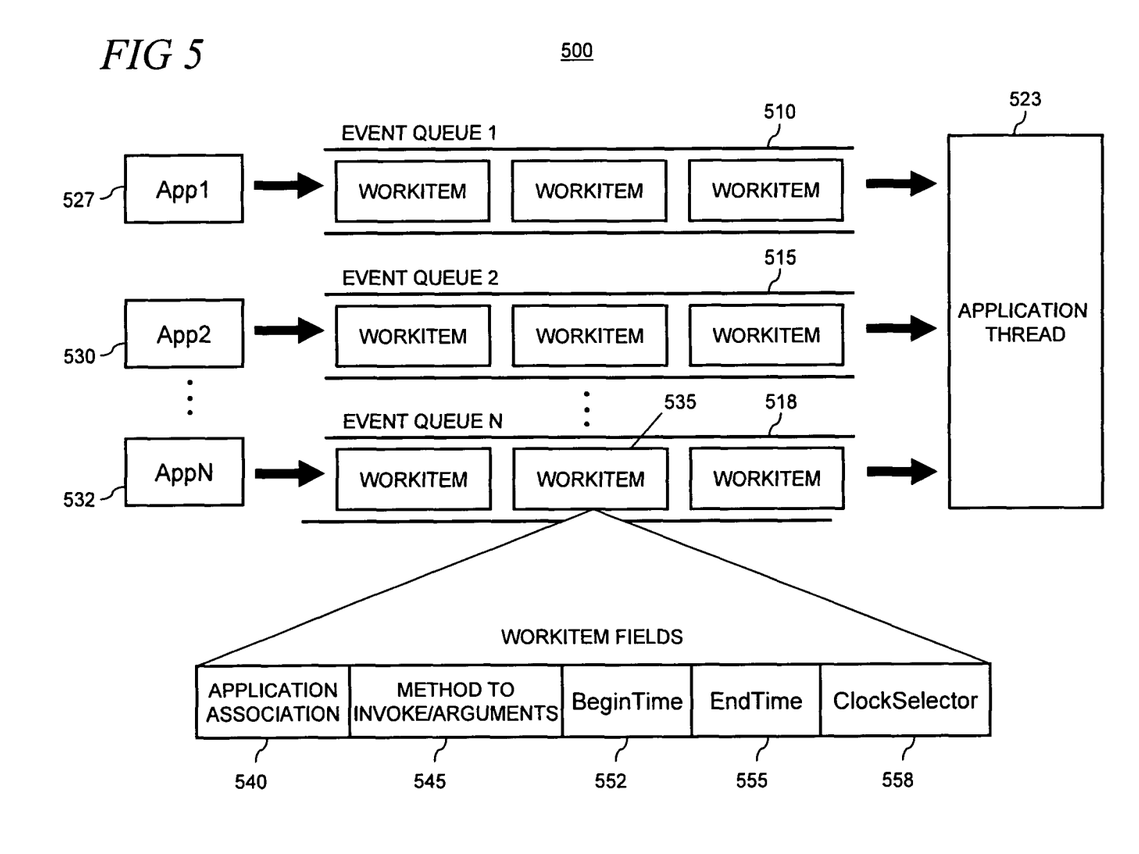
FIG. 5 is a block diagram of an illustrative arrangement having a plurality of event queues and a single application thread.

FIG. 5 is a block diagram of an illustrative arrangement 500 having with a plurality of event queues 1, 2 . . . N as designated by reference numerals 510, 515, and 518, respectively, and a single application thread 523. In this illustrative arrangement, all applications running on an ICP (such as ICP 435 in FIG. 4) are single threaded, and application thread 523 is dedicated for such purpose. However, ICP 435 does not necessarily need to be single threaded itself. In alternative implementations, ICP 435 may utilize other threads, for example for pre-fetching resources into a cache.

Each of the event queues 510, 515, and 518 are arranged to feed into application thread 523 from their head ends (located at the right side of FIG. 5). A plurality of applications App1, App2 . . . AppN as designated by reference numerals 527, 530 and 532, respectively, are arranged to post workitems, representatively designated by reference numeral 535, into the queues 510, 515 and 518 from their tail ends (on the left side of FIG. 5).

Application events are events which are fired by an application. These may include events fired by either script (e.g, script host 115 in FIG. 1) or by markup (e.g., markup 120 in FIG. 1). Application events, in most scenarios, are handled only by script. However, applications 527, 530 and 532 do not invoke script or markup functionality directly. Instead, all such functionality is posted to the applications' respective event queues in the form of workitems and are invoked when the application thread 523 processes the workitem.

In alternative arrangements, events from sources other than applications are also scheduled using event queues. For example, user events are fired by user interaction with a remote control. System events are events fired by the interactive media player such as player 405 shown in FIG. 4 and described in the accompanying text.

Each workitem in events queues 510, 515 and 518 contains fields as shown in FIG. 5. These fields include an application association field 540, a method field 545, a BeginTime field 552, an EndTime field 555, and an optional ClockSelector field 558.

The application association field 540 indicates the particular application to which a workitem applies. The method field 545 contains a method that is invoked when the workitem is processed by the application thread 523. Method field 545 also includes arguments for the method.

The BeginTime field 552 and EndTime field 555 are used, respectively, to indicate when the workitem's method begins and ends. In this illustrative example, time is expressed using Application Time. However, in alternative examples, the BeginTime field 552 and EndTime field 555 contain values which may be alternatively expressed in Title Time, Application Time or Page Time depending on the requirements of a particular setting. In such cases, the particular timeframe used by a workitem is indicated in the ClockSelector field 558. Regardless of the timeframe utilized, a BeginTime for a workitem must always be less than the EndTime.

Figure 6:
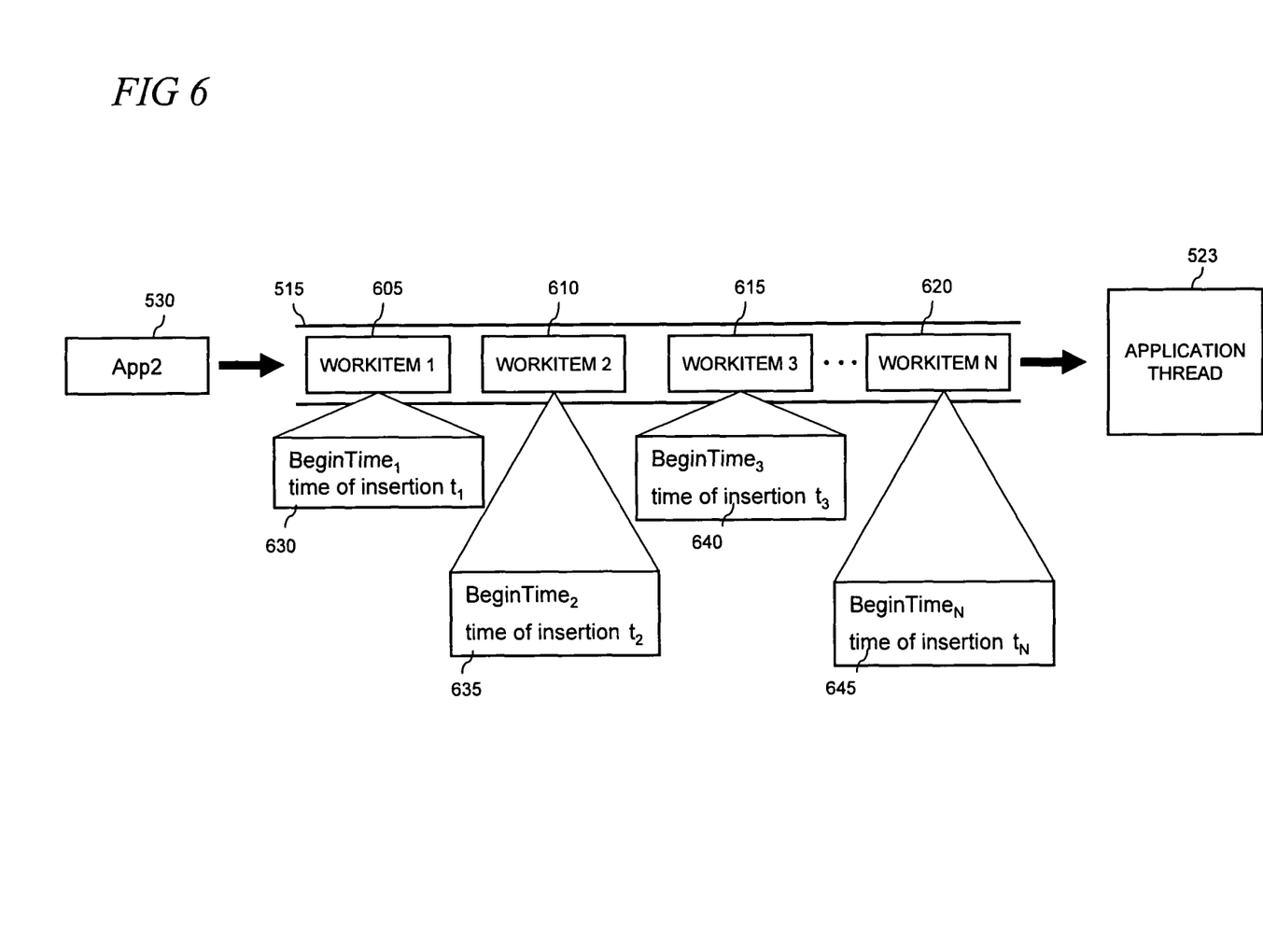
FIG. 6 is a block diagram of an illustrative event queue showing the ordering of workitems first by BeginTime, and then by the time in which workitems were inserted into the event queue.

FIG. 6 is a block diagram of event queue 515 showing the ordering of workitems contained therein. The other event queues 510 and 518 (FIG. 5) are not shown in FIG. 6 for ease of clarity in illustration. However, the ordering methodology described below is equally applicable to such other event queues.

Event queue 515 includes workitems 1, 2, 3 . . . N as indicated by reference numerals 605, 610, 615 and 620, respectively. Each workitem includes the fields shown in FIG. 5 and described in the accompanying text.

Workitem 605 includes a BeginTime$_1$, and an associated time of insertion $t_1$, into the event queue 515, as indicated in block 630 in FIG. 6. Similarly, workitem 610 includes a BeginTime$_2$ and an associated time of insertion $t_2$ into the event queue 515 as indicated in block 635. Workitem 615 includes a BeginTime$_3$ and an associated time of insertion $t_3$ into the event queue 515 as indicated in block 640. And, workitem 620 includes a BeginTime$_N$ and an associated time of insertion $t_N$ into the event queue 515, as indicated in block 645.

In this illustrative example, workitems are ordered in the event queue 515 first by BeginTime and then by the time in which workitems were inserted into the event queue. Such ordering results in the application thread 523 processing workitems in order of BeginTime, or when two workitems have the same begin time, then in FIFO (first in, first out) order.

Thus, as workitem 620 is at the head of event queue 515 the implication is that BeginTime$_N$<BeginTime$_3$; or if BeginTime$_N$=BeginTime$_3$, then $t_N$<$t_3$ (i.e., workitem 620 was inserted into event queue 515 before workitem 615. Following this same reasoning for workitems 605, 610 and 615, then:

BeginTime$_3$ < BeginTime$_2$;
   or if BeginTime$_3$ = BeginTime$_2$, then $t_3$ < $t_2$; and
BeginTime$_2$ < BeginTime$_1$;
   or if BeginTime$_2$ = BeginTime$_1$, then $t_2$ < $t_1$ The ordering of workitems in an event queue is performed using two alternative methods: workitems may be ordered when inserted into an event queue or when workitems are extracted from the event queue prior to processing. Either arrangement is equally usable so long as the processing of workitems from the event queue is performed by BeginTime followed by queue insertion time.

Figure 7:
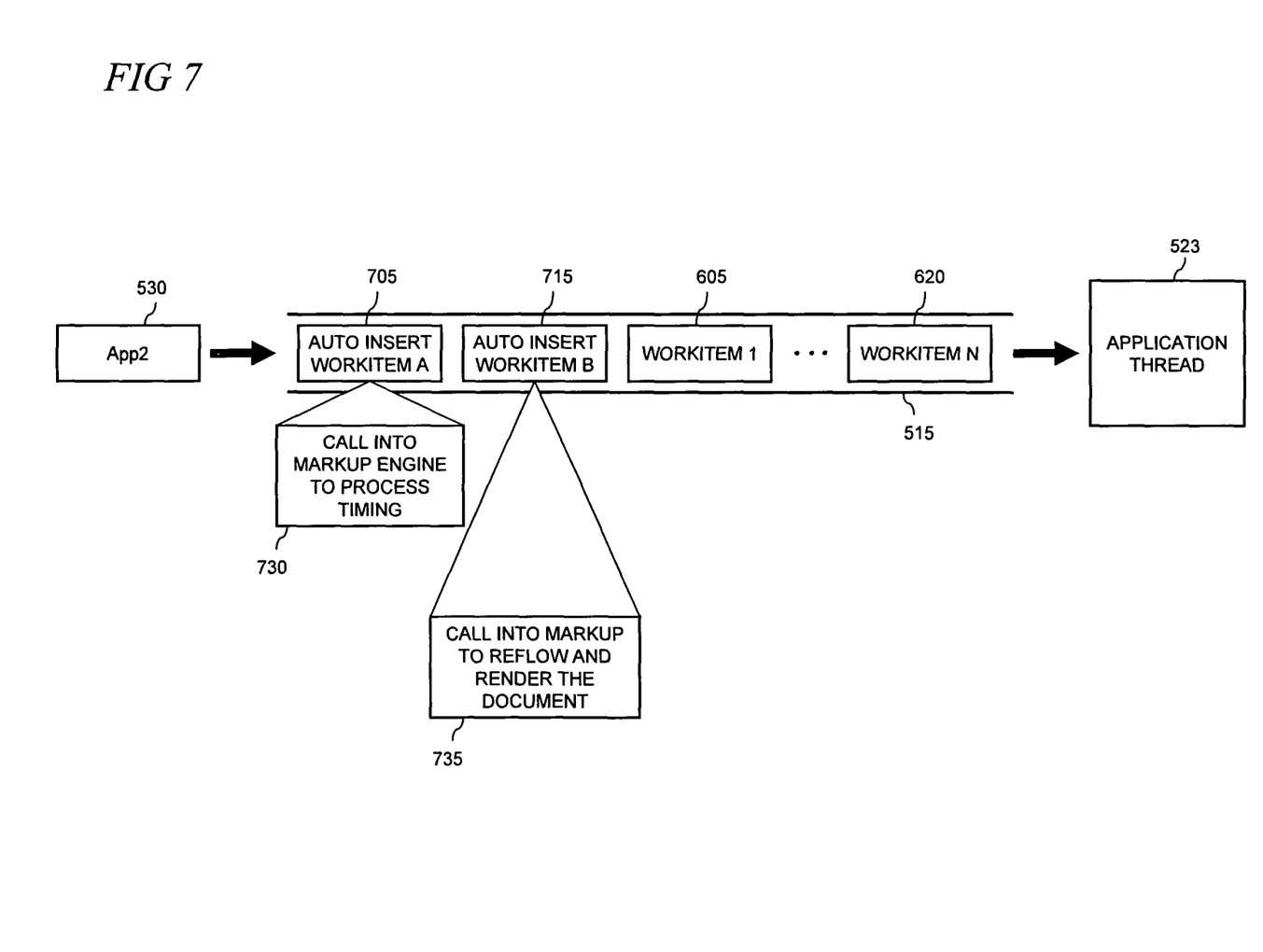
FIG. 7 is a block diagram of an illustrative arrangement where the application thread automatically inserts two workitems at the end of the event queue.

FIG. 7 is a block diagram of an illustrative arrangement where the application thread 523 automatically inserts two workitems 705 and 715 at the tail end of the event queue 515. The other event queues 510 and 518 (FIG. 5) are not shown in FIG. 7 for ease of clarity in illustration. However, the automatic insertion of workitems by the application thread as described below is equally applicable to such other event queues. As shown, the automatically inserted workitems 705 and 715 follow after workitems 605 and 620 in the event queue 515. In an illustrative example, the automatic insertion of the two workitems is performed when an application starts and the workitems are rescheduled after each tick.

Workitem 705 includes calls into the markup engine (e,g, a markup engine disposed in ICP 435 in FIG. 4) to process timing for a page in application App2 530 as indicated in block 730. In block 735, workitem 715 includes calls into the markup to reflow application App2's markup to reflect processed events and then render the markup on the display device (e.g., display 455 in FIG. 4). Workitems 705 and 715 are always the last workitems processed in an application's tick by application thread 523.

Figure 8:
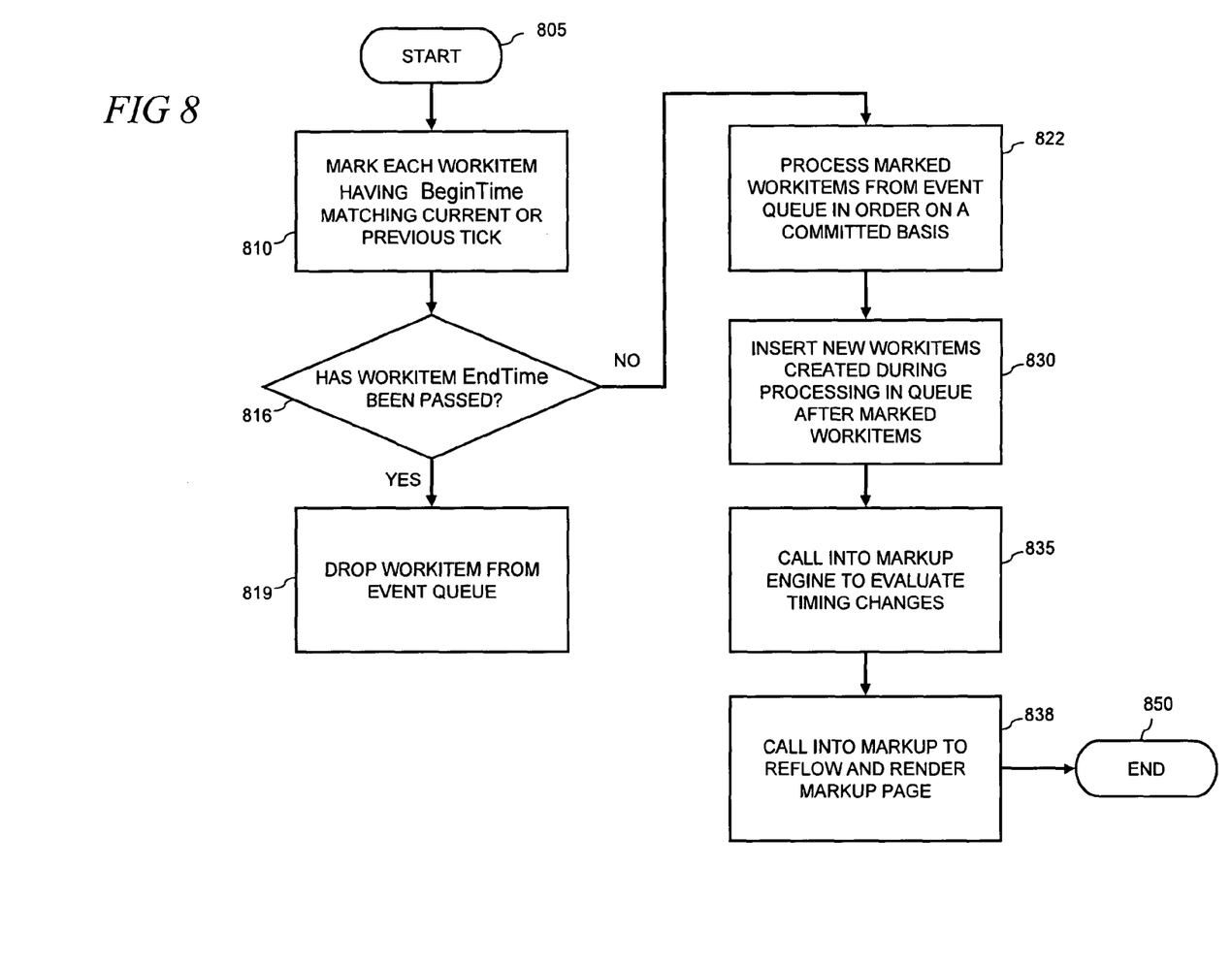
FIG. 8 is a flow chart of an illustrative method for queuing workitems associated with events that occur in an interactive media environment.

FIG. 8 is a flow chart of an illustrative method for queuing workitems associated with events that occur in an interactive media environment. In an illustrative example of event queuing with a single application thread, the method is performed by the arrangements shown in FIGS. 4-7 and described in the accompanying text. The method shown is typically performed iteratively for each tick.

The process starts at block 805. At block 810, when the application thread 523 (FIGS. 5-7) is free to process workitems, it first marks each workitem in the event queue 515 whose BeginTime corresponds to the current or previous ticks. Application thread 523 will only process marked workitems. Thus a workitem in event queue 515 will never be processed before its BeginTime.

At decision block 816, if a marked workitem's EndTime has already been passed then it is dropped from event queue 515 as indicated in block 819. No processing on that workitem will be performed in such a case. Should application App2 530 reloads its page, the application's page clock is reset to zero and all outstanding (i.e., queued) workitems based on the application's page clock are dropped from event queue just as if they had reached their EndTime.

If at decision block 816 a marked workitem's EndTime has not been passed, then control is passed to block 822 and the application thread 523 processes the workitem. As noted above in the description accompanying FIG. 6, each workitem is processed in order from the event queue 515: first by BeginTime, followed by the time each workitem was inserted into the event queue 515.

Both repetitive events and one-shot (i.e., single occurrence, non-repetitive) events are managed using the method shown in FIG. 8. A repetitive event may include a periodic event where the associated workitem has an EndTime that is equal to the next scheduled BeginTime. That is, each periodic event has a duration equal to the event's period.

Periodic events typically include events like timer events and application drawing events. For example, if an application's script (e.g., in script host 115 in FIG. 1) creates a timer that will call back once every 10 seconds, it will add a timer workitem to the event queue 515 with a BeginTime equal to the current time plus 10 seconds. The EndTime will be set to the BeginTime plus 10 seconds. Once the timer workitem is executed out of the event queue 515, the BeginTimes and EndTimes will be adjusted by adding another 10 seconds and the workitem will be reinserted into the event queue 515 at the proper location based on the new BeginTime.

Periodic events are invoked whenever possible. But if they cannot be processed by the application thread 523 before the EndTime in their associated workitems expires, then that particular invocation is dropped and the next invocation is scheduled with a new workitem.

Advantageously, the event queuing method enables a parameter may be passed to timer events to indicate the time that the event is to be invoked. This parameter must be the same as the BeginTime in the associated workitem. Script associated with a periodic timer event might not be run exactly at the invoked time, as noted above. However, as each workitem includes a method field 545 (FIG. 5) that specifies arguments to the method, the argument's value will reflect an intended time of invocation and not the actual time. Accordingly, the handler for a timer event will know what time (i.e., tick) it is handling.

A one-shot event has a corresponding workitem with an EndTime of INFINITE. Therefore, a one-shot event will never be dropped from the event queue 515. For example, if a one-shot event is an input event, then that event's handler is scheduled as a workitem in the event queue 515 with an EndTime of INFINITE.

As indicated in block 822, the processing is performed on a committed basis. That is, once the application thread 523 begins processing a workitem from the event queue 515, it does not stop processing. For example, script which may be long running is not aborted nor are exceptions injected into the script in order to throw it out. While such a scheme can tie up the application thread while it processes script, as noted above the ICP (e.g., ICP 435 in FIG. 4) may be arranged to include other threads which continue to run during the committed processing of workitems. In alternative arrangements, it may be desirable to handle workitems in a manner such that a new event is inserted into the event queue 515 based on its relative BeginTime to be handled after the commited workitems.

At block 830, any new workitems that are created during the processing of marked workitems are inserted into the event queue 515 after the marked workitems, regardless of their BeginTime. The process of marking workitems, committing to them and inserting new workitems after the committed workitems in an event queue (as shown in blocks 810, 822 and 830) ensures that the applications are always afforded some visible progress.

In accordance with one aspect of the invention, an application scheduler is provided which is arranged to manage processing of workitems corresponding to events occurring in an interactive media environment where time is counted using a sequence of ticks, each of the workitems having a timestamp that includes a begin time and an end time, and includes a plurality of event queues for queuing the work items, each of the event queues having a head end and a tail end and arranged so that workitems are rocessed from the head end of the event queue each of the event queues further being accessible by respective ones of a plurality of interactive media applications in order to insert the workitems into the event queues; and an application thread coupled to the plurality of event queues at their head ends, the application thread being arranged for marking workitems whose begin time corresponds to a current tick or a previous tick, processing marked workitems, and inserting workitems associated with new events that occur during the processing at the tail end of an event queue so that they follow after marked workitems.

As indicated at block 835 and 828 in FIG. 8, the application thread automatically inserts two workitems into each application's event queue for each tick, as shown in FIG. 7 and described in the accompanying text. These workitems call into the markup engine for each application to evaluate application timing and then reflow and render the markup on a display device. As noted above, the workitems are inserted upon application start and a rescheduled after each tick. In addition, these two workitems are always the last two to be processed for an application's tick and are treated as periodic events that may be dropped from the event queue 515.

It is noted that for the sake of clarity and ease of illustration in the description above that data, programs, and other executable program components such as operating systems are shown is discrete blocks, boxes or other elements although it is recognized and emphasized that such programs and components may reside at various times in different storage, memory or processing components of any hardware host used and are executed by one or more processors in such host hardware.

Although various illustrative arrangements and methods for managing application states in an interactive media environment have been shown and described, it should be understood that the scope of the claims appended hereto shall not necessarily be limited to the specific features, arrangements or methods described. Instead, the specific features, arrangements or methods are disclosed as illustrative forms of implementing managed applications states in an interactive media environment as more particularly claimed below.

The invention claimed is:

1. An electronic device hosting an application scheduler arranged to manage processing of workitems corresponding to events occurring in an interactive media environment where time is counted using a sequence of ticks, each of the workitems having a timestamp that includes a begin time and an end time, the application scheduler comprising: a plurality of event queues for queuing the work items, each of the event queues having a head end and a tail end and arranged so that workitems are processed from the head end of the event queue, each of the event queues further being accessible by respective ones of a plurality of interactive media applications in order to insert the workitems into the event queues; and an application thread coupled to the plurality of event queues at their head ends, the application thread being arranged for marking workitems whose begin time corresponds to a current tick or a previous tick, processing marked workitems, and inserting workitems associated with new events that occur during the processing at the tail end of an event queue so that they follow after marked workitems.

2. The electronic device of claim 1 wherein the inserting is performed irregardless of a timestamp for the new events.

3. The electronic device of claim 1 where each workitem includes a field for indicating a method to be invoked and arguments for the method.

4. The electronic device of claim 1 where each workitem includes a clock selector field that indicates whether the timestamp is measured in title time, page time or application time.

5. The electronic device of claim 1 where the application thread drops all workitems from the event queue when an interactive media application running in the interactive media environment reloads its page.

6. The electronic device of claim 1 where all interactive media applications in the interactive media environment run on the same thread of a playback engine.

7. The electronic device of claim 1 in which workitems represent one or more events fired by the interactive media application.

8. The electronic device of claim 7 in which the one or more events are fired by a markup in the interactive media application.

9. The electronic device of claim 1 in which the one or more events are fired by a script in the interactive media application.

10. The electronic device of claim 1 in which workitems represent one or more events generated by an interactive media player.

11. The electronic device of claim 1 in which workitems represent one or more events fired by user interaction in the interactive media environment.

* * * * *